(12) United States Patent
Wright et al.

(10) Patent No.: US 7,747,307 B2
(45) Date of Patent: Jun. 29, 2010

(54) METHOD AND SYSTEM FOR MARKER LOCALIZATION

(75) Inventors: J. Nelson Wright, Mercer Island, WA (US); Barry Friemel, Redmond, WA (US)

(73) Assignee: Calypso Medical Technologies, Inc., Seattle, WA (US)

( * ) Notice: Subject to any disclaimer, the term of this patent is extended or adjusted under 35 U.S.C. 154(b) by 1196 days.

(21) Appl. No.: 10/679,801

(22) Filed: Oct. 6, 2003

(65) Prior Publication Data

US 2004/0176931 A1   Sep. 9, 2004

Related U.S. Application Data

(60) Provisional application No. 60/451,962, filed on Mar. 4, 2003.

(51) Int. Cl.
*A61B 5/05* (2006.01)
(52) U.S. Cl. .................. 600/409; 600/407; 600/424; 600/431; 324/207.11
(58) Field of Classification Search ............... 600/407, 600/409, 424, 431; 324/207.11
See application file for complete search history.

(56) References Cited

U.S. PATENT DOCUMENTS

| | | | | | |
|---|---|---|---|---|---|
| 4,745,401 | A | * | 5/1988 | Montean | 340/572.3 |
| 5,057,095 | A | * | 10/1991 | Fabian | 604/362 |
| 5,731,996 | A | * | 3/1998 | Gilbert | 702/150 |
| 6,484,118 | B1 | * | 11/2002 | Govari | 702/150 |
| 2002/0193685 | A1 | * | 12/2002 | Mate et al. | 600/424 |

* cited by examiner

*Primary Examiner*—Brian Casler
*Assistant Examiner*—James Kish
(74) *Attorney, Agent, or Firm*—Perkins Coie LLP

(57) ABSTRACT

A method and system for locating a source of a signal. The source may be a wireless marker that is implanted in an object, such as a human body. The signal generated by the marker is a magnetic field. The location system uses an array of sensors to measure the magnetic field of the marker at various sensor locations. The location system compares the set of actual measurements to sets of reference measurements for various known locations within a bounding volume. Based on the comparisons, the location system identifies the set of reference measurements that most closely matches the set of actual measurements. The location system then uses sets of reference measurements for known locations near the closest known location to more accurately determine the marker location when it is not actually at one of the known locations.

61 Claims, 9 Drawing Sheets

METHOD AND SYSTEM FOR MARKER LOCALIZATION

CROSS-REFERENCE TO RELATED APPLICATIONS

This application claims the benefit of U.S. Provisional Patent Application No. 60/451,962, filed Mar. 4, 2003, and is related to U.S. patent application Ser. No. 10/334,700 filed Dec. 30, 2002, and U.S. patent application Ser. No. 10/382,123, filed Mar. 4, 2003, both of which are incorporated herein by reference in their entirety.

BACKGROUND

Implantable markers have been used to identify locations within objects, such as a human body. For example, a marker may be implanted in a patient within an organ of interest. As the patient moves, the marker can be used to track the location of the organ. Various techniques have been used to identify the location of such markers. For example, one technique requires a person to move a sensor over the area above the marker. When the sensor is positioned directly over the marker, the person may be given a visual or audio indication. A difficulty with such a technique for identifying a marker location is it does not provide the actual location of the marker (e.g., x, y, and z coordinates) and may not have the needed degree of accuracy.

One technique has been described for locating a source of an electrical signal within the brain by sensing the magnetic field generated by an electrical signal. This technique relies on a probability distribution to help identify the location of the source. A difficulty with such a technique is it may not have the needed degree of accuracy.

It would be desirable to have a technique for locating an implantable marker in real time and in the needed degree of accuracy.

DETAILED DESCRIPTION

A method and system for locating a source of a signal is provided. In one embodiment, the source is a wireless marker that is implanted in an object, such as a human body. The signal generated by the marker is a magnetic field. The location system uses an array of sensors to measure the magnetic field of the marker at various sensor locations. Each sensor generates a measurement of one component of the magnetic field integrated over the aperture of the sensor. The location system determines the location of the marker (i.e., marker location) from a set or array of measurements taken from the sensors (i.e., set of actual measurements). The location system compares the set of actual measurements to sets of reference measurements for various known locations within a bounding volume (also referred to as a localization volume). The bounding volume delimits the three-dimensional area in which the marker can be localized. A reference measurement for a known location indicates the measurements to be expected from the sensors when the marker is located at that known location. Based on the comparisons, the location system identifies the set of reference measurements that most closely matches the set of actual measurements. The known location of the identified set of reference measurements represents the known location that is closest to the marker location, which is referred to as the "closest known location." The location system then uses sets of reference measurements for known locations near the closest known location to more accurately determine the marker location when it is not actually at one of the known locations. In one embodiment, the location system determines the marker location based on an interpolation of a set of calculated measurements from the sets of reference measurements of known locations near the closest known location. Thus, the location system uses the set of reference measurements to find a known location that is close to the marker location to an accuracy that is dependent on the spacing of the known locations. The location system then uses an interpolation of sets of reference measurements at known locations near the closest known location to more accurately identify the marker location at a location between the known locations.

Figure 1:
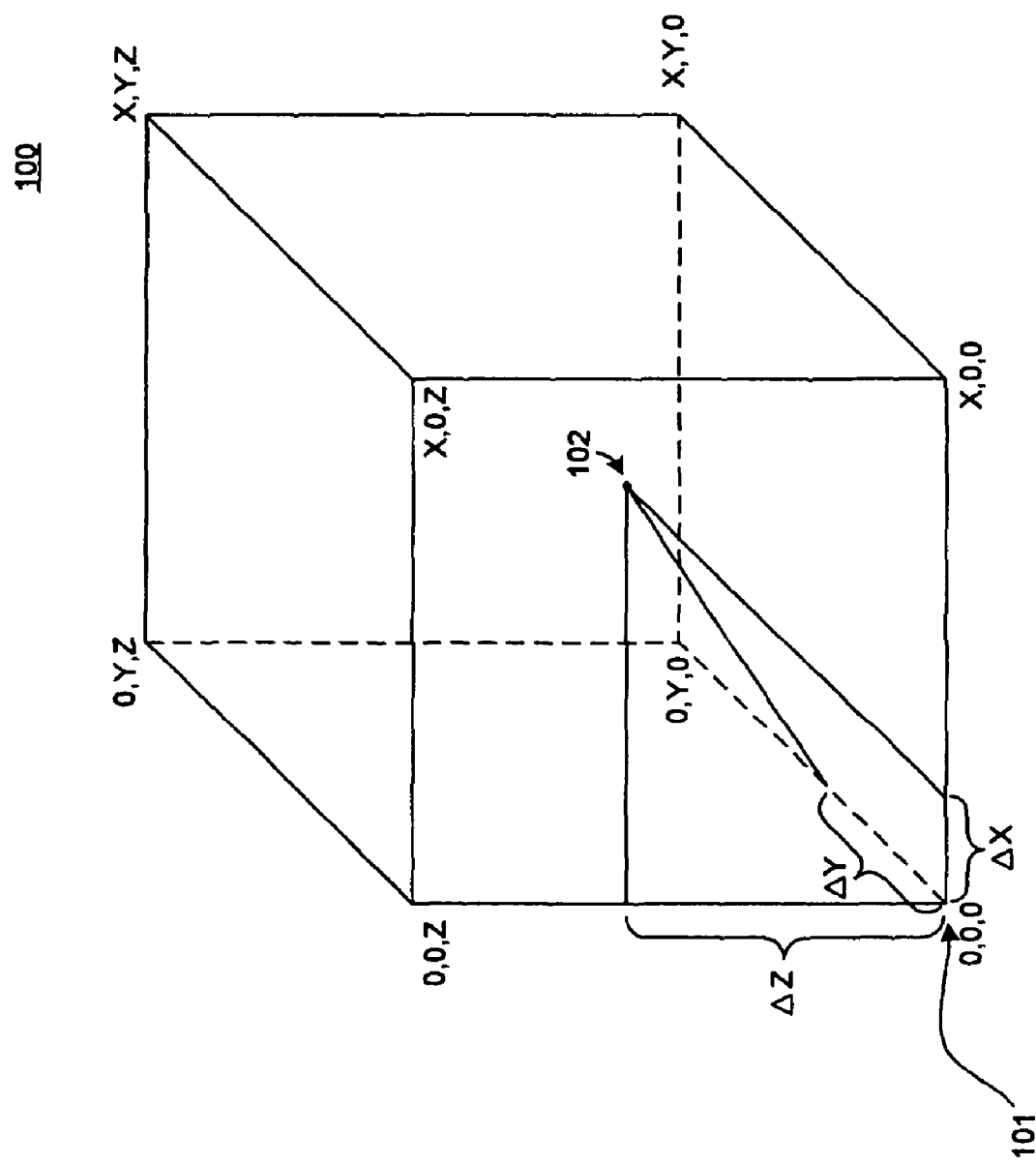
FIG. 1 is a block diagram illustrating a bounding volume containing a marker in one embodiment.
Figure 2:
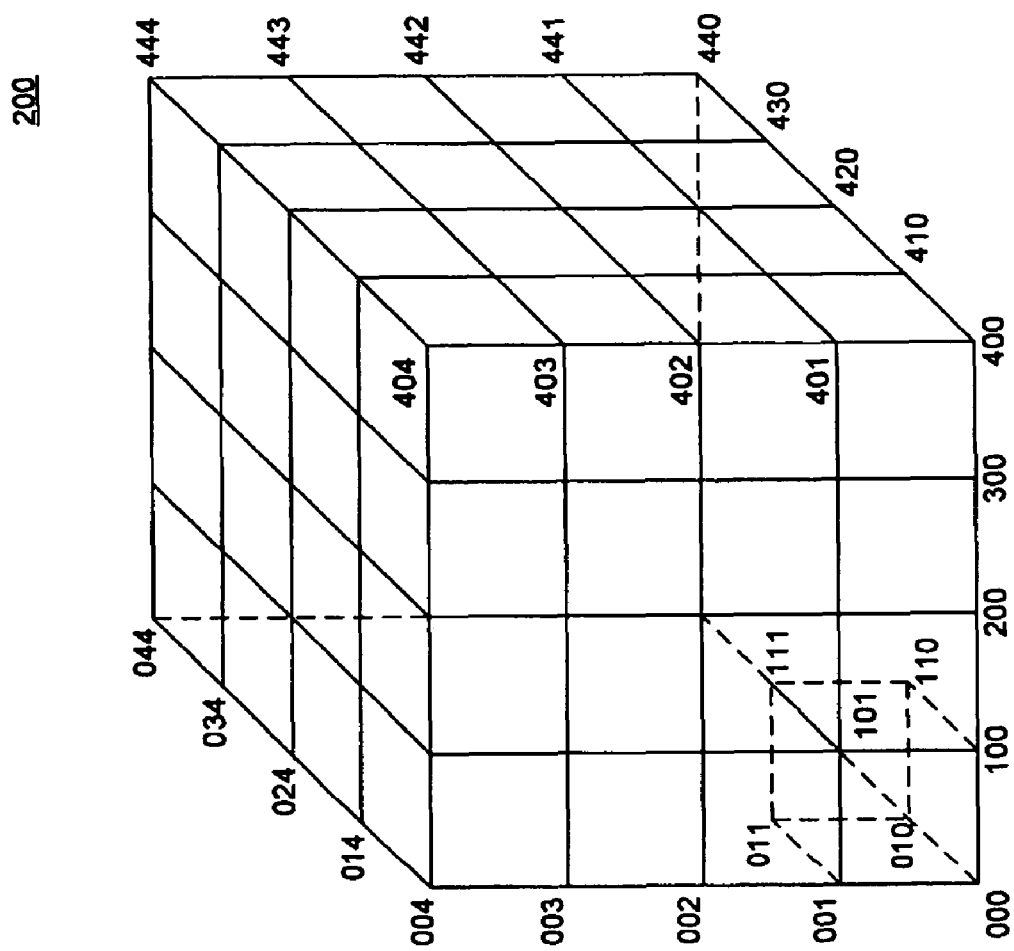
FIG. 2 is a block diagram of a bounding box that is divided into a cubic grid of four sub-boxes in each of the x, y, and z directions.

FIG. 1 is a block diagram illustrating a bounding volume containing a marker in one embodiment. The bounding volume in this embodiment is a rectangular volume referred to as a bounding box. Locations or points within the bounding box 100 are specified using x, y, and z coordinates relative to the origin 101 with coordinates (0, 0, 0). The bounding box has X units along the x axis, Y units along the y axis, and Z units along the z axis. The marker location 102 has coordinates ($\Delta x$, $\Delta y$, $\Delta z$). The location system divides the bounding box into a grid of sub-boxes of a uniform size. FIG. 2 is a block diagram of a bounding box that is divided into a cubic grid of four sub-boxes in each of the x, y, and z directions. The bounding box 200 thus contains 64 sub-boxes. Although the bounding box and the sub-boxes shown in this embodiment are cubes, one skilled in the art will appreciate that bounding boxes and sub-boxes of various shapes can be used. Sub-box 201 has grid points (0, 0, 0), (0, 0, 1), (0, 1, 0), (0, 1, 1), (1, 0, 0), (1, 0, 1), (1, 1, 0), and (1, 1, 1) at its corners. Each corner point of a sub-box corresponds to a known location and is referred to as a "grid point." Each grid point, or more generally a reference point, thus has a set of reference measurements associated with it. The sub-boxes are identified by the corner point with the lowest x, y, and z coordinates that conceptually corresponds to the lower left forward corner of a sub-box. Sub-box 201 is uniquely identified by grid point (0, 0, 0), and the sub-box next to it to the right is uniquely identified by grid point (1, 0, 0).

The location system uses an objective function to evaluate which of the sets of reference measurements is most consistent with a set of actual measurements. Using the objective function, the system can locate the closest grid point to the marker point (i.e., the point corresponding to the marker location) using various search techniques. One search technique is a comprehensive search that calculates the objective function at each grid point and selects the grid point whose set of reference measurements is most consistent with the set of actual measurements based on an evaluation of the objective function. Another search technique starts at a grid point and evaluates the objective function at the grid point and at neighbor grid points. The search technique then selects the neighbor grid point whose objective function evaluation indicates it is closer to the marker location and repeats the process of evaluating the objective function of its neighbor grid points. This process is repeated until a grid point is found whose objective function evaluation indicates that its set of reference measurements is more consistent than any of its neighbor grid points to the actual measurements (e.g., closer to the marker point). Another search technique divides the bounding volume into sub-volumes and evaluates the objective function at the center grid point of each sub-volume. The search technique selects the sub-volume whose objective function evaluation for its center grid point indicates that it is closer to the marker point than the other center grid points. The search technique then divides the selected sub-volume into sub-sub-volumes and repeats the evaluation of the objective function and selection of sub-volumes until a sub-volume cannot be further divided. One of the grid points of the final sub-volume is the closest grid point.

In one embodiment, once the closest grid point is located, the location system identifies which of the eight sub-boxes that include the closest grid point as a corner contains the marker location. This sub-box is referred to as the "bounding sub-box." (More generally, the location system identifies a sub-volume near the closest reference point that presumably contains the marker point as the bounding sub-volume.) In one embodiment, the location system evaluates the objective function at the two adjacent grid points to the closest grid point in each of the x, y, and z directions. The location system selects the adjacent grid point in each direction whose evaluation of the objective function indicates it is closer to the marker point. The location system then selects the sub-box that has all three of the selected adjacent grid points as corners of the sub-box that contains the marker point. For example, if coordinates of the closest grid point are (10, 10, 10), the adjacent grid points in the x direction are (9, 10, 10) and (11, 10, 10), in the y direction are (10, 9, 10) and (10, 11, 10), and in the z direction are (10, 10, 9) and (10, 10, 11). If the closer adjacent grid points as indicated by the objective function are (9, 10, 10) for the x direction, (10, 11, 10) for the y direction, and (10, 10, 11) for the z direction, then the location system selects the sub-box whose lower left forward corner is at grid point (9, 10, 10) as the bounding sub-box.

Once the location system has identified the bounding sub-box, it then searches for the marker point within the bounding sub-box. Since the location system does not have a set of reference measurements for the points within the bounding sub-box, except for the corner points, the location system cannot evaluate the objective function directly from the sets of reference measurements for those points. In one embodiment, the location system can interpolate the value of an objective function for points within the bounding sub-box from the values of the objective functions at the corner points (and possibly additional grid points near the bounding sub-box). For example, the value of the objective function for a point within the bounding sub-box can be an interpolation based on the distance from the point to each of the corners (e.g., a trilinear interpolation of the values of the objective function at the corners). It has been found, however, that interpolation of the objective function can be computationally expensive. In another embodiment, the location system can interpolate a set of reference measurements for a point within the bounding sub-box based on the sets of reference measurements at the corner points (and possibly additional grid points near the bounding sub-box). Such interpolated reference measurements are referred to as "calculated measurements." The location system uses the set of calculated measurements for a point to evaluate the objective function for that point. In one embodiment, the location system uses a trilinear interpolation of the sets of reference measurements at the corner points adjusted by a second order difference of the sets of reference measurements of the grid points adjacent to the corner points. One skilled in the art will appreciate that many different interpolation techniques can be used by the location system, for example, as discussed in W. H. Press, et al. *Numerical Recipes in C/C++: The Art of Scientific Computing*, (Cambridge Univ. Press 2d ed. Feb. 2002), which is hereby incorporated by reference. To search for the marker point in one embodiment, the location system uses a Taylor series expansion of the objective function using calculated measurements to guide the search. Conceptually, the location system evaluates the objective function at a candidate point and uses the gradient (i.e., the first derivative) and the Hessian (i.e., the second derivative) of the objective function to identify, as the next candidate point, the point at which the gradient is zero. The location system calculates the value of the objective function at that next candidate point and repeats the process of selecting next candidate points until a desired value of the objective function is achieved or until the distance between the successive candidate points is within a desired tolerance.

Mathematical Description of the Location System

The location system is provided with a vector $s_b$ containing a set of actual measurements arising from a marker, emitting a dipolar magnetic field, located at an unknown location $r_b$ and having a magnetic moment $m_b$. The elements of vector $s_b$ have a one-to-one correspondence to the sensors in the array. The location system then estimates location $r_b$ from the actual measurements. In the absence of measurement error, additive noise, or other corrupting influences, the relationship between the actual measurements, the marker location, and the magnetic moment vector of the marker is represented by $$s_b = H_b m_b \qquad (1)$$

where $H_b$ is a matrix containing coefficients indicative of the relative contribution of the x, y, and z components of the magnetic moment to each actual measurement when the marker is at location $r_b$. Specifically, $H_b$ in equation (1) has three columns; the first column indicates the sensitivity of the measurement to the x component of $m_b$, the second column to the y component, and the third column to the z component. Hence, if the location system has 32 sensors, then $H_b$ is a 32-by-3 matrix. Furthermore, $H_b$ is sensitive to the location of the marker, but independent of the magnetic moment of the marker, and in general each possible marker location r can be associated (given a coordinate system and units of measurement implicit in equation (1)) with a specific matrix H.

The H matrices of interest (corresponding to marker locations of interest) can be empirically or computationally determined in advance of locating a marker. The coefficients of H can be empirically determined for a given marker location by first locating a test marker at the given location and orienting it in the x direction and using the resulting measurements as the first column of H. The marker can then be oriented in the y direction and the resulting measurements used as the second column of H, and similarly for the z direction. It will be appreciated that the measurements thus obtained are scaled by the magnitude of the magnetic moment of the test marker; hence, this magnitude is an implicit unit of measurement. Alternatively, when the sensor array is comprised of coils, the coefficients of H can be calculated using Faraday's equation (as in, for example, S. Ramo, et al. *Fields and Waves in*

*Communication Electronics* (John Wiley and Sons 2d ed. 1984), which is hereby incorporated by reference. The determination of H in advance of locating a marker has significant practical advantages, as an empirical determination may be impossible at the time of locating a marker, and a computational determination may be difficult or expensive to do with sufficient speed at the time of locating.

It will be appreciated that the numerical content of H determined by the methods above will depend on the choice of coordinate system, as well as the magnitude of the magnetic moment of the test marker. Specifically, a rotation of the Cartesian coordinates will result in an alternative H, in which the columns are linear combinations of the columns of H associated with nonrotated coordinates. These differences are unimportant to the problem of determining the location of a marker, arising as they do from the arbitrary imposition of a coordinate system. Accordingly, all H matrices associated with the same location are considered equivalent, even if their numerical content differs. It follows that the columns of all equivalent H matrices span the same subspace. See B. Noble & J. W. Daniel, *Applied Linear Algebra* (Prentice-Hall 3d ed. 1988), which is hereby incorporated by reference. The columns of each H matrix thus determined represent a set of reference measurements associated with a possible marker location, in which the pertinent characteristic of the set of reference measurements is the subspace thus spanned. In other words, in the absence of noise, interference, or other sources of error, an actual measurement from a marker will be a linear combination of the columns of the H matrix associated with the location of the marker.

The problem of inverting equation (1), i.e., estimating the location of a marker given the vector of actual measurements, is the problem of finding the H matrix that is most consistent with the actual measurements (and any other relevant prior information, such as the noise or interference to which the measurements are subject), in which case the best estimate of marker location is the location associated with the most consistent H.

The location system uses an error metric to quantify the consistency between a candidate H (corresponding to a candidate location r of the marker whose field is measured) and a vector s of actual measurements. The error metric is represented by the scalar $$E_1 = (Hm - s)^T (Hm - s) \quad (2)$$

The minimization of $E_1$ with respect to unknown parameters represents a least-mean-square ("LMS") estimate of those parameters. See, for example, S. M. Kay, *Fundamentals of Statistical Signal Processing: Estimation Theory* (Prentice Hall PTR 1993), which is hereby incorporated by reference.

When the marker is a wireless implant, it is usually impractical to know the magnetic moment with sufficient precision for localization. In this case, the LMS solution for m in terms of H and s is well known to be $$m_{LMS} = (H^T H)^{-1} H^T s \quad (3)$$

Substituting this into equation (2), it is seen that the minimization of $E_1$ corresponds to the maximization of $$E_2 = s^T H (H^T H)^{-1} H^T s \quad (4)$$

This is the objective function used in a preferred embodiment of the invention. It will be appreciated that $H(H^T H)^{-1} H^T$ is a projection matrix (see G. Strang, *Linear Algebra and its Applications* (Academic Press 2d ed. 1980)), which is hereby incorporated by reference), and $H(H^T H)^{-1} H^T s$ is the projection of s into the subspace spanned by the columns of H. Accordingly, $E_2$ is the inner product of s with its projection into the column space of H. Each equivalent H yields the same value of $E_2$. The LMS estimate of the marker location is the location r corresponding to the set of reference measurements in the matrix H that effects the maximization of $E_2$.

In a preferred embodiment of the invention, the H matrices corresponding to a grid of points spanning a bounding box (i.e., a localization volume) are predetermined and stored in computer-readable form. At the time of locating a marker, a two-step process is followed. First, a coarse search is effected, in which equation (4) is evaluated on appropriate grid points to identify the grid point which maximizes $E_2$, followed by the identification of eight grid points that are expected to bound an off-grid location which maximizes $E_2$. These grid points define a bounding sub-box. Second, a fine search is effected, in which equation (1) is maximized using interpolated values of H, corresponding to off-grid locations, that are computed using the predetermined H matrices.

The inventors have found that the columns of H matrices thus interpolated can span the correct subspace with a high degree of accuracy, even with relatively coarse spatial sample grids. It has been found, conversely, that interpolated projection matrices $H(H^T H)^{-1} H^T$ do not represent subspaces with sufficient accuracy unless the spatial sample grid is substantially finer. The use of relatively coarse spatial grids has substantial practical advantages in that the amount of computer memory required to store the predetermined matrices is proportional to the number of grid points. For example, if the localization volume is 14 cm×14 cm×20 cm, and one 32×3 H matrix is predetermined for each spatial grid point on a 1 cm pitch, the total storage requirement is 376,320 numbers in computer memory.

By contrast, if one 32×32 $H(H^T H)^{-1} H^T$ matrix is predetermined on a spatial grid with a 1 mm pitch, the storage requirement exceeds four billion numbers.

Interpolation of Reference Measurements

In the neighborhood of any bounding sub-box, off-grid H matrices can be computed using any of a number of interpolation techniques known to those skilled in the art of numerical computation. In a preferred embodiment of the invention, a second order polynomial expansion is used.

An interpolation point is denoted as a fraction ($\Delta x$, $\Delta y$, $\Delta z$) away from the origin of the bounding sub-box. The fractions vary from (0, 0, 0) at the origin to (1, 1, 1) at the corner diagonal from the origin. Besides the eight points at the corners of the bounding sub-box, the preferred embodiment uses 24 additional points, which are the two points adjacent to the bounding sub-box along each of the 12 edges.

Figure 8:
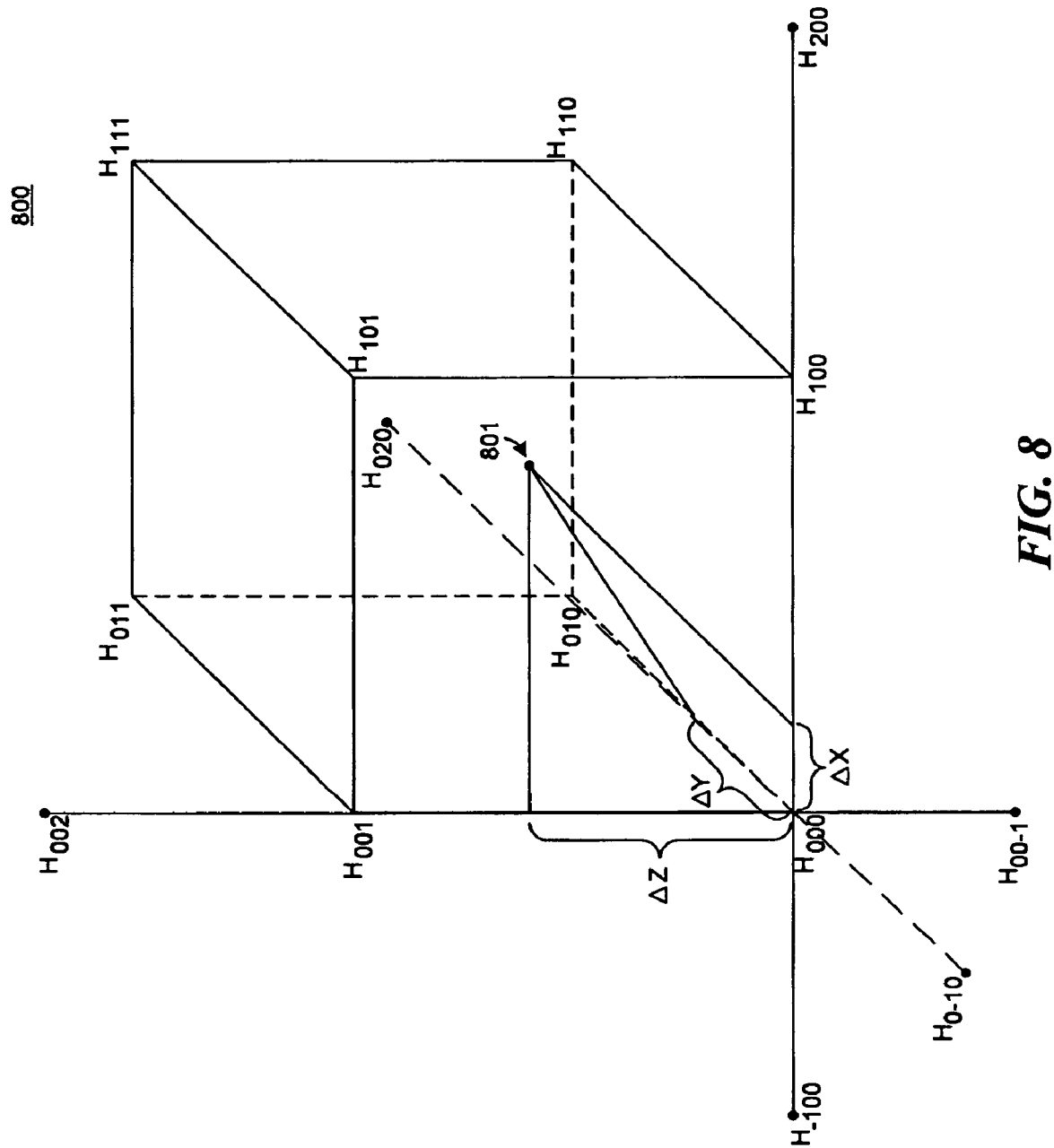
FIG. 8 illustrates an interpolation point within a bounding sub-box.

FIG. 8 illustrates an interpolation point within a bounding sub-box. The bounding sub-box has eight corners labeled $H_{000}$, $H_{001}$, $H_{010}$, $H_{011}$, $H_{100}$, $H_{101}$, $H_{110}$, $H_{111}$. The corner labeled $H_{000}$ is at the origin. The coordinates of the interpolation point 801 are ($\Delta x$, $\Delta y$, $\Delta z$). A trilinear interpolation combines the H matrices at the corners weighting them linearly based on the distances from the interpolation point. Thus, for example, an interpolation point in the center of the bounding sub-box box (e.g., (0.5, 0.5, 0.5)) can be associated with a trilinearly interpolated H matrix that is the average of the H matrices of the corners. More generally, a trilinear interpolation takes the form given by the following equation:

$$\tilde{H}(\Delta x, \Delta y, \Delta z) = (1 - \Delta x)(1 - \Delta y)(1 - \Delta z) H_{000} + \\ (\Delta x)(1 - \Delta y)(1 - \Delta z) H_{100} + \quad (5)$$

-continued $(1 - \Delta x)(\Delta y)(1 - \Delta z)H_{010} +$ $(1 - \Delta x)(1 - \Delta y)(\Delta z)H_{001} +$ $(\Delta x)(\Delta y)(1 - \Delta z)H_{110} +$ $(\Delta x)(1 - \Delta y)(\Delta z)H_{101} +$ $(1 - \Delta x)(\Delta y)(\Delta z)H_{011} +$ $(\Delta x)(\Delta y)(\Delta z)H_{111}$ To add the second order terms, the location system fits a second order function along each of the 12 edges of the bounding sub-box using the four grid points along the line of each edge. For example, the second order difference interpolation for the edge between the corners labeled $H_{000}$ and $H_{100}$ would use the corners labeled $H_{-100}$, $H_{000}$, $H_{100}$, and $H_{200}$. An interpolated H matrix includes the eight terms of the trilinear interpolation and the 12 terms of the second order interpolation and is represented by the following equation:

$$\tilde{H}(\Delta x, \Delta y, \Delta z) = (1 - \Delta x)(1 - \Delta y)(1 - \Delta z)H_{000} + \qquad (6)$$

$(\Delta x)(1 - \Delta y)(1 - \Delta z)H_{100} +$ $(1 - \Delta x)(\Delta y)(1 - \Delta z)H_{010} +$ $(1 - \Delta x)(1 - \Delta y)(\Delta z)H_{001} +$ $(\Delta x)(\Delta y)(1 - \Delta z)H_{110} +$ $(\Delta x)(1 - \Delta y)(\Delta z)H_{101} +$ $(1 - \Delta x)(\Delta y)(\Delta z)H_{011} +$ $(\Delta x)(\Delta y)(\Delta z)H_{111} +$ $\Delta x(1 - \Delta x)(1 - \Delta y)(1 - \Delta z)[-H_{-100} + H_{000} + H_{100} - H_{200}]/4 +$ $\Delta x(1 - \Delta x)(\Delta y)(1 - \Delta z)[-H_{-110} + H_{010} + H_{110} - H_{210}]/4 +$ $\Delta x(1 - \Delta x)(1 - \Delta y)(\Delta z)[-H_{-101} + H_{001} + H_{101} - H_{201}]/4 +$ $\Delta x(1 - \Delta x)(\Delta y)(\Delta z)[-H_{-111} + H_{011} + H_{111} - H_{211}]/4 +$ $\Delta y(1 - \Delta y)(1 - \Delta x)(1 - \Delta z)[-H_{0-10} + H_{000} + H_{010} - H_{020}]/4 +$ $\Delta y(1 - \Delta y)(\Delta x)(1 - \Delta z)[-H_{1-10} + H_{100} + H_{110} - H_{120}]/4 +$ $\Delta y(1 - \Delta y)(1 - \Delta x)(\Delta z)[-H_{0-11} + H_{001} + H_{011} - H_{021}]/4 +$ $\Delta y(1 - \Delta y)(\Delta x)(\Delta z)[-H_{1-11} + H_{101} + H_{111} - H_{121}]/4 +$ $\Delta z(1 - \Delta z)(1 - \Delta x)(1 - \Delta y)[-H_{00-1} + H_{000} + H_{001} - H_{002}]/4 +$ $\Delta z(1 - \Delta z)(\Delta x)(1 - \Delta y)[-H_{10-1} + H_{100} + H_{101} - H_{102}]/4 +$ $\Delta z(1 - \Delta z)(1 - \Delta x)(\Delta y)[-H_{01-1} + H_{010} + H_{011} - H_{012}]/4 +$ $\Delta z(1 - \Delta z)(\Delta x)(\Delta y)[-H_{11-1} + H_{110} + H_{111} - H_{112}]/4$ A characteristic of the interpolated matrices in this embodiment is that the values of the interpolated matrix match the set of reference measurements at the eight corner points of the bounding sub-box exactly, and at each of the 24 additional points in a least-mean-squared sense. Another characteristic of this and similar embodiments is that the interpolated matrices can be computed very quickly, to effect real-time localization, on general-purpose computers without special hardware. A third characteristic is the simplicity of spatial derivatives of the interpolated matrices, which enables rapid iteration of the fine search for the maximum of the objective function.

Using an interpolated matrix $\tilde{H}$ associated with a point in space, the objective function associated with that point can be represented as:

$$E_2 \cong s^T \tilde{H}(\tilde{H}^T \tilde{H})^{-1} \tilde{H}^T s \qquad (7)$$

In a preferred embodiment, the system represents the objective function as a Taylor series expansion and solves for the point at which the gradient is zero. See R. Fletcher, *Practical Methods of Optimization* (John Wiley and Sons 1980), which is hereby incorporated by reference. A Taylor series expansion of the objective function about some spatial point $r_0$ is:

$$E_2(r_0 + \rho) \cong E_2(r_0) + \left.\frac{\partial E_2}{\partial r}\right|_{r_0} \rho + \frac{1}{2}\rho^T \left.\frac{\partial^2 E_2}{\partial r^2}\right|_{r_0} \rho + \ldots \qquad (8)$$

$$\cong a + b^T \rho + \frac{1}{2}\rho^T C \rho$$

Where $\rho$ is an incremental spatial offset to the point of interest, b is the 3-by-1 gradient vector of $E_2$ at $r_0$, and C is the 3-by-3 Hessian. Taking the derivative of this expansion with respect to $\rho$ and setting it equal to zero yields:

$$\rho = -C^{-1}b \qquad (9)$$

Replacing $r_0$ with $r_0 + \rho$, this evaluation can continue iteratively until $\rho$ converges to $(0, 0, 0)$, whence $r_0$ is identified as a stationary point of $E_2$, and presumably a maximum, if the initial point was sufficiently close.

The computation of the gradient and Hessian can be effected in terms of the precomputed H matrices using equations (6) and (7). The gradient at r=(x, y, z) is, by definition $$\frac{\partial E_2}{\partial r} = \begin{bmatrix} \frac{\partial E_2}{\partial x} \\ \frac{\partial E_2}{\partial y} \\ \frac{\partial E_2}{\partial z} \end{bmatrix} \quad (10)$$

where the first derivative of $E_2$ with respect to x is represented by $$\frac{\partial E_2}{\partial x} \cong \frac{\partial}{\partial x} s^T \tilde{H} (\tilde{H}^T \tilde{H})^{-1} \tilde{H}^T s \quad (11)$$

$$= 2s^T \left\{ \tilde{H} (\tilde{H}^T \tilde{H})^{-1} \frac{\partial \tilde{H}^T}{\partial x} \left( I - \tilde{H} (\tilde{H}^T \tilde{H})^{-1} \tilde{H}^T \right) \right\} s$$

and similarly for derivatives with respect to y and z. The Hessian at r=(x, y, z) is, by definition $$\frac{\partial^2 E_2}{\partial r^2} = \begin{bmatrix} \frac{\partial^2 E_2}{\partial x^2} & \frac{\partial^2 E_2}{\partial x \partial y} & \frac{\partial^2 E_2}{\partial x \partial z} \\ \frac{\partial^2 E_2}{\partial x \partial y} & \frac{\partial^2 E_2}{\partial y^2} & \frac{\partial^2 E_2}{\partial y \partial z} \\ \frac{\partial^2 E_2}{\partial x \partial z} & \frac{\partial^2 E_2}{\partial y \partial z} & \frac{\partial^2 E_2}{\partial z^2} \end{bmatrix} \quad (12)$$

The second partial with respect to x and y is $$\frac{\partial^2 E_2}{\partial x \partial y} \cong \frac{\partial^2}{\partial x \partial y} s^T \tilde{H} (\tilde{H}^T \tilde{H})^{-1} \tilde{H}^T s \quad (13)$$

$$= 2s^T \left\{ \left( I - \tilde{H} (\tilde{H}^T \tilde{H})^{-1} \tilde{H}^T \right) \frac{\partial \tilde{H}}{\partial y} (\tilde{H}^T \tilde{H})^{-1} \frac{\partial \tilde{H}^T}{\partial x} (I - \right.$$

$$\tilde{H} (\tilde{H}^T \tilde{H})^{-1} \tilde{H}^T) - \tilde{H} (\tilde{H}^T \tilde{H})^{-1} \frac{\partial \tilde{H}^T}{\partial y} \tilde{H} (\tilde{H}^T \tilde{H})^{-1} \frac{\partial \tilde{H}^T}{\partial x} (I -$$

$$\tilde{H} (\tilde{H}^T \tilde{H})^{-1} \tilde{H}^T) - \tilde{H} (\tilde{H}^T \tilde{H})^{-1} \frac{\partial \tilde{H}^T}{\partial x} \tilde{H} (\tilde{H}^T \tilde{H})^{-1} \frac{\partial \tilde{H}^T}{\partial y} (I -$$

$$\tilde{H} (\tilde{H}^T \tilde{H})^{-1} \tilde{H}^T) - \tilde{H} (\tilde{H}^T \tilde{H})^{-1} \frac{\partial \tilde{H}^T}{\partial x} (I -$$

$$\tilde{H} (\tilde{H}^T \tilde{H})^{-1} \tilde{H}^T) \frac{\partial \tilde{H}}{\partial y} (\tilde{H}^T \tilde{H})^{-1} \tilde{H}^T + \tilde{H} (\tilde{H}^T \tilde{H})^{-1} \frac{\partial^2 \tilde{H}^T}{\partial x \partial y} (I -$$

$$\left. \tilde{H} (\tilde{H}^T \tilde{H})^{-1} \tilde{H}^T \right) \right\} s$$

The other entries in the Hessian can be represented similarly.

It has been found that the computation of the gradient and Hessian can be effected very efficiently in terms of the precomputed H matrices, using equation (6).

Weighting of the Optimization Metric

As is known in the art of numerical optimization, when measurements from some channels are more reliable than others, which may be due to interference, correlated noise, or nonuniform noise, then equation (2) may be modified according to $$E_1 = (Hm - s)^T C^{-1} (Hm - s) \quad (14)$$

where C is the spatial covariance matrix of the additive noise or interference. A whitening matrix W can be defined such that $W^T W = C^{-1}$, in which case equation (14) can be expressed $$E_1 = (WHm - Ws)^T (WHm - Ws) \quad (15)$$

It is thus seen that simply replacing H with WH and s with Ws in the foregoing, and, in particular, in the objective function of equation (4), suffices to account for the weighting in the error metric in equation (14) (as described in S. M. Kay, *Fundamentals of Statistical Signal Processing: Estimation Theory* (Prentice Hall PTR 1993), which is hereby incorporated by reference). The whitening matrix is not dependent on the location of the marker, so all reference measurements are weighted equally. The precomputed H matrices associated with a grid of points could be weighted during precomputation to eliminate the need to do so at the time of localization. It has been found in practice, however, that the weighting can be effected in real time, and this is a preferred embodiment when weighting is needed or desired for better performance in the presence of noise or interference. It will be appreciated that the interpolation and maximization techniques disclosed above will work unchanged with weighted H matrices, and in practice the computation to weight the H matrices can be done either before or after interpolation.

Reducing the Effects of Interference Using Column Augmentation

In practice there are sources of magnetic interference, such as CRTs and motors, that can reduce the accuracy of the location system. When there is knowledge of the relative amplitudes of interfering signals across the sense channels, but not their absolute amplitudes, then the signal model of equation (1) may be modified according to $$s_b = [H_b \ A] \begin{bmatrix} m_b \\ \alpha \end{bmatrix} \quad (16)$$

where the columns of the augmentation matrix A are specified to match the interfering signals to within a scale factor, and the vector α contains the unknown scale factors associated with each column. Ideally, there is a one-to-one correspondence between the interfering sources and the columns of the augmentation matrix, but in practice the columns may be chosen to correspond to components of interfering sources, in which case there may be more columns than interferers.

It will be appreciated that α is independent of the marker location and is of no interest for localization. It will be further appreciated that the optimization procedure described above can be applied with each set of reference measurements H replaced by the augmented set [H A] in equation (4). Alternatively, if whitening matrices are used, then WH is replaced by W[H A]. In either event, some of the degrees of freedom of the location system can be used to account for the interference, hence, substantially removing its effect on the estimate of the marker location.

For example, if the interfering source is a CRT displaced from the array of sensors by several feet, the interfering magnetic field will exhibit, to the zeroth order, a constant magnitude across the array. In this case, the augmentation matrix A consists of a single column in which each entry is a constant. The numerical value of the constant is unimportant to the operation of the method. A first order description of the CRT interference would include gradient terms across the array. In this case, two more columns would be added to the augmentation matrix A, for a total of three. Assuming the array is planar and described by a Cartesian coordinate system, then the first additional column could consist of entries proportional to the x coordinate of the associated sensor, and the second additional column could consist of entries proportional to the y coordinate. Once again, it is the proportionality, rather than the specific numerical values, that is pertinent. Such an approach can be extended to a second order, requiring three additional columns (proportional to $x^2$, $xy$, and $y^2$), and a higher order if required. The inventors have found that this approach is effective in suppressing the detrimental effects of interfering sources that are relatively far from the array of sensors, for example distances of greater than two meters from an array of 40 cm×40 cm, even when the interference is of relatively large magnitude. The inventors have also found that this technique is effective in suppressing the detrimental effects of conductors near the localization volume, which can often be modeled as interference.

When it is possible to know the relative spatial characteristics of the interference more precisely, then the columns of the augmentation matrix can be specified to match, to within a scale factor, these characteristics. This embodiment has the advantage of suppressing interference using fewer degrees of freedom of the location system. However, this embodiment may be more sensitive to inaccuracies in the spatial characteristics of the interference, and if this knowledge is imperfect, then it may be preferred to use low order terms in the columns of the augmentation matrix as specified above.

It will be appreciated that the augmentation columns are independent of marker location, so there is little processing required to augment the H matrices in the objective function of equation (4) prior to its actual computation. It will likewise be appreciated that the interpolation and maximization techniques disclosed above will work unchanged with augmented H matrices, and that column augmentation can be applied either before or after interpolation. The inventors have found that augmentation by one, three, or six columns (zeroth, first, or second order) can be effected without compromising the ability of the location system to function in real time.

There is an alternative mathematical formulation to column augmentation that may be preferred in some embodiments. Using the signal model of equation (16) in the error metric of equation (14) yields $$E_1 = (Hm + A\alpha - s)^T C^{-1} (Hm + A\alpha - s) \quad (17)$$

When this is minimized with respect to the vector $\alpha$ and the result substituted back, the metric can be written $$E_1 = (PWHm - PWs)^T (PWHm - PWs) \quad (18)$$

where the projection matrix P is given by $$P = I - (WA)[(WA)^T (WA)]^{-1} (WA)^T \quad (19)$$

and I is the identity matrix. This is the projection matrix associated with the null space of the columns of WA. When W is associated with uniform spatially white noise, then it can be replaced in equations (18) and (19) by the identity matrix. It will be noted that the optimization procedure described above can be applied with each set of reference measurements H replaced by the set PWH and the vector of actual measurements s with PWs in equation (4), and in particular the interpolation and maximization techniques can be applied unchanged. While this is mathematically equivalent to column augmentation, it is effected as a weighting of the H matrices rather than an augmentation. This approach may be preferred in practice as it unifies column augmentation and weighting. It will be appreciated, however, that this technique is distinct from equation (14) as P is singular and does not possess an inverse. In this regard, the method differs from those in the prior art of magnetic localization, as neither P nor PW can be representative of the inverse of a spatial noise correlation matrix. More specifically, the method disclosed herein is not intended to whiten the spatial noise, as in the prior art, but rather to suppress completely any interference that is a linear combination of the columns of the augmentation matrix.

Components of the Location System

Figure 3:
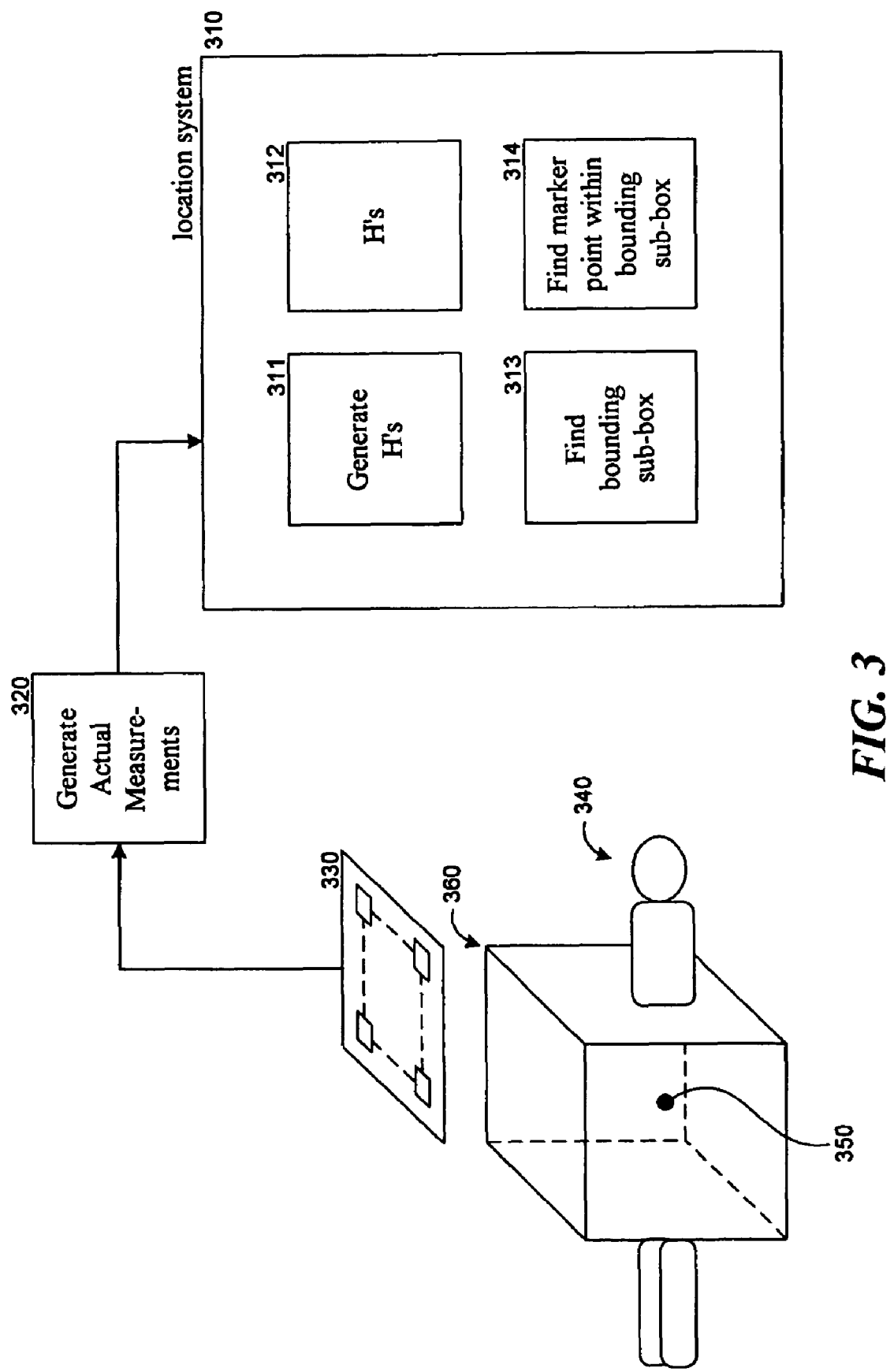
FIG. 3 illustrates components of the location system in one embodiment.

FIG. 3 illustrates components of the location system in one embodiment. The location system 310 receives sets of actual measurements from the generate actual measurements component 320. The sensor array is positioned near the object 340 (e.g., human body) in which the marker 350 has been implanted. In some embodiments, the marker may be affixed to the object, rather than implanted in the object. More generally, the marker is associated with the object so that the location of the marker is indicative of the location of the object. The bounding box 360 indicates the volume that contains the marker. The location system includes a generate H's component 311, a collection of H's 312, a find bounding sub-box component 313, and a find marker point within bounding sub-box component 314.

The location system may be implemented on a computer system that includes a central processing unit, memory, input devices (e.g., keyboard and pointing devices), output devices (e.g., display devices), and storage devices (e.g., disk drives). The memory and storage devices are computer-readable media that may contain instructions that implement the location system. In addition, the data structures may be stored or transmitted via a data transmission medium, such as the Internet, a local area network, a wide area network, or a point-to-point dial-up connection.

Search for Closest Grid Point

Figure 4:
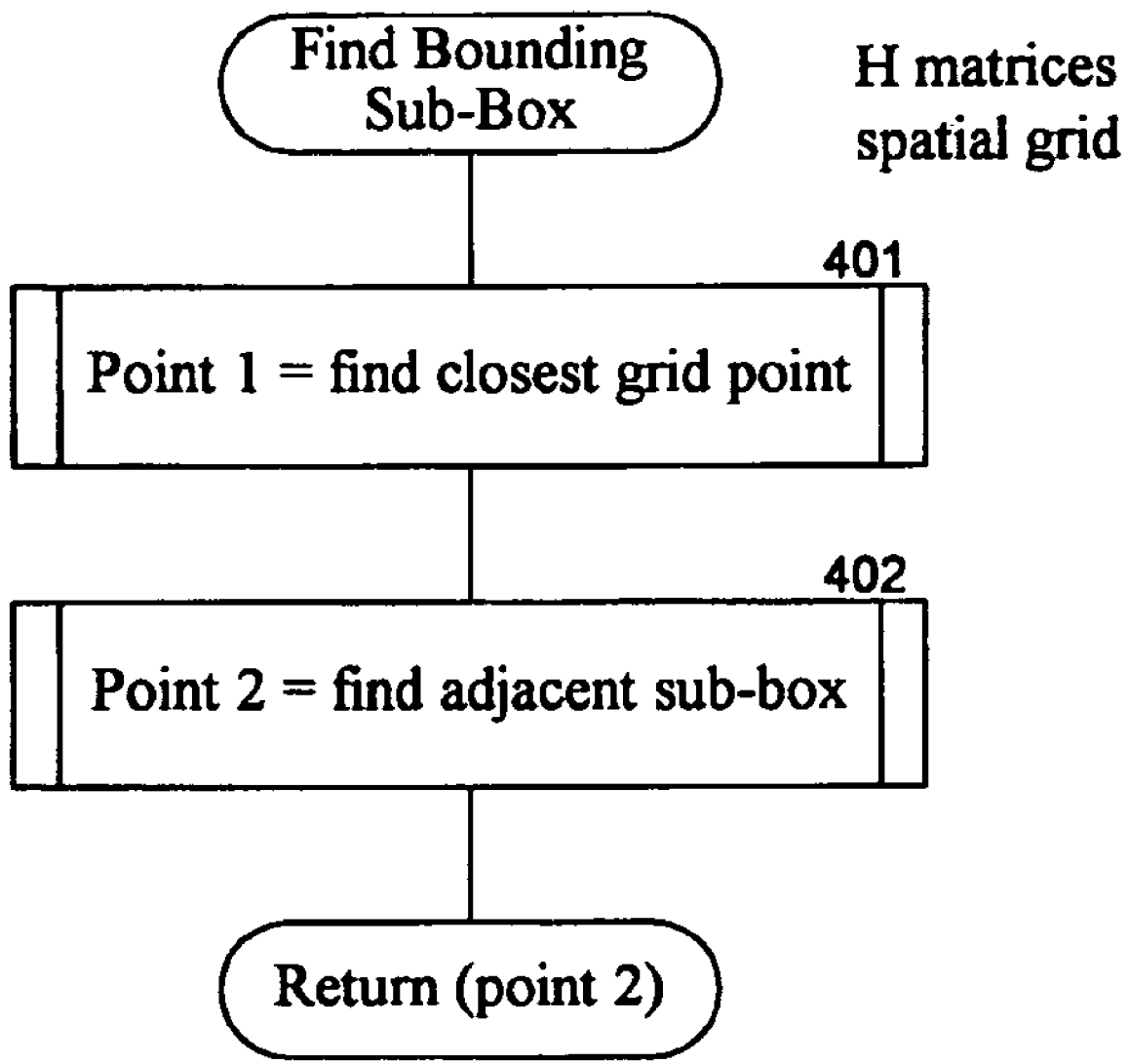
FIG. 4 is a flow diagram illustrating the processing of the find bounding sub-box component in one embodiment.

FIG. 4 is a flow diagram illustrating the processing of the find bounding sub-box component in one embodiment. The component identifies the bounding sub-box by first locating the grid point (i.e., the closest grid point) within the bounding box with the maximum value of the objective function. The component then identifies one of the eight sub-boxes adjacent to the closest grid point that is expected to contain the marker point. This component is passed the H matrices and the corresponding spatial grid spanning the bounding box. In block 401, the function invokes the find closest grid point component. That component returns the closest grid point within the bounding box. In block 402, the component invokes the find adjacent sub-box component passing the closest grid point and the H matrices. That function returns the lower left forward point of the bounding sub-box. The component then completes.

Figure 5:
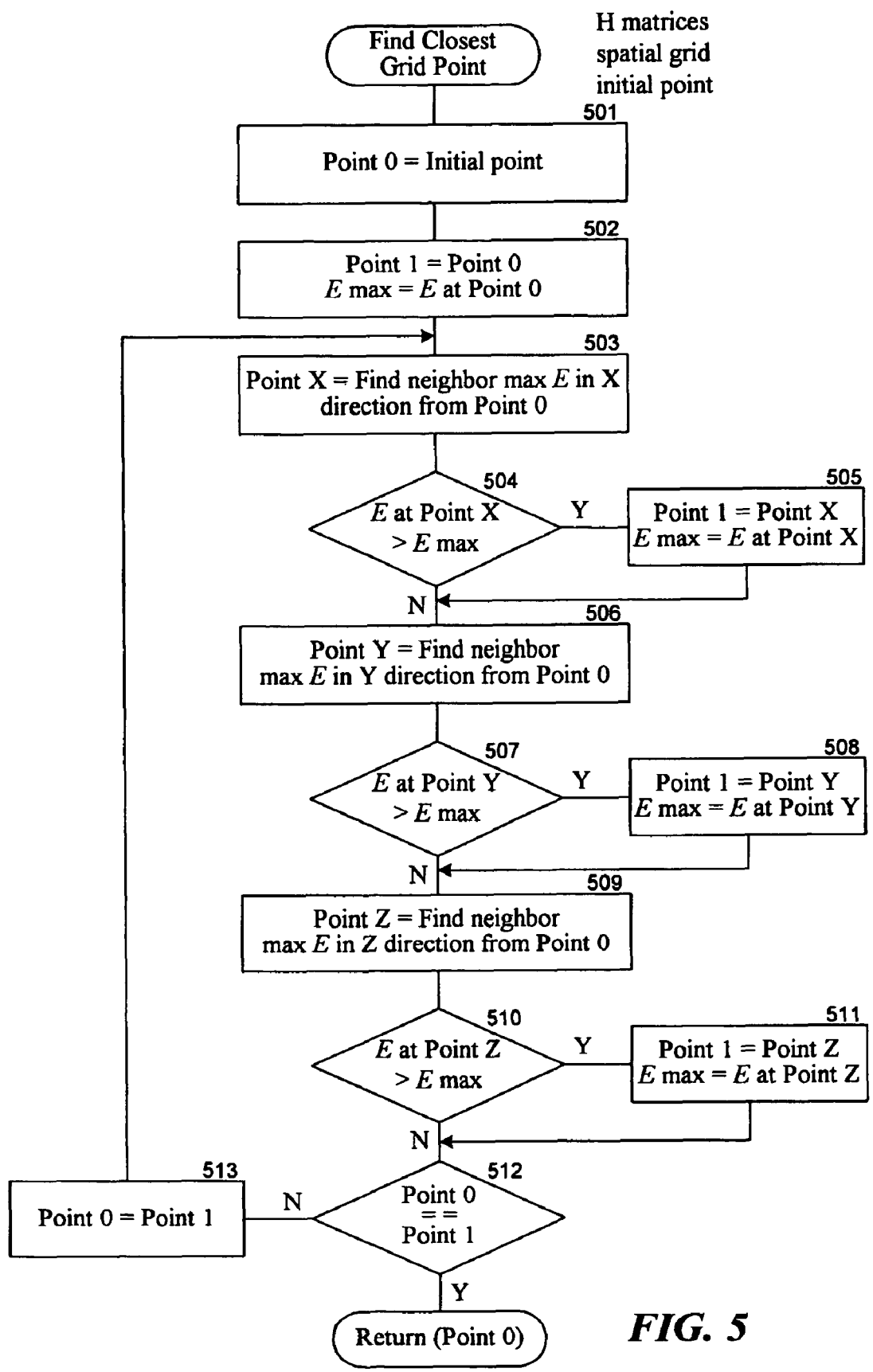
FIG. 5 is a flow diagram illustrating the processing of the find closest grid point component in one embodiment.

FIG. 5 is a flow diagram illustrating the processing of the find closest grid point component in one embodiment. The component is passed the H matrices and the corresponding spatial grid spanning the bounding box, as well as an initial grid point. In this embodiment, the component implements a hill-climbing algorithm starting at the initial grid point. The component uses an iterative technique that initially sets the current grid point to the initial grid point and calculates the objective function at the initial grid point. The component then calculates the objective function at each of the six grid points adjacent to the current grid point (i.e., two grid points adjacent to each of the x, y, and z directions). The component selects the adjacent grid point whose value of the objective function is greatest. If the value of the objective function at that selected grid point is greater than the value of the objective function at the current grid point, the component sets the new current grid point to the selected grid point and repeats the process of selecting the adjacent grid point with the greatest value of the objective function. If, however, the value of the objective function at the selected grid point is not greater than the value of the objective function at the current grid point, then the solution has converged on the current grid point and the component returns the current grid point as the closest grid point. In block 501, the component initializes the current point (i.e., point0) to the initial grid point. In block 502, the component initializes the maximum value of the objective function found so far (i.e., $E_{MAX}$) to the value of the objective function at the initial grid point and sets the maximum adjacent grid point (i.e., point1) to the initial grid point. In blocks 503-513, the component loops following the grid point adjacent to the current grid point whose value of the objective function is greatest. In block 503, the component sets the grid point in the x direction (i.e., pointX) to the adjacent grid point in the x direction with the larger value of the objective function. In decision block 504, if the value of the objective function at the point in the x direction is larger than the maximum value of the objective function encountered so far, then the component continues at block 505, else the component continues at block 506. In block 505, the component sets the maximum adjacent grid point to the point in the x direction and sets the maximum value of the objective function to the value of the objective function at the point in the x direction. In blocks 506-508 and 509-511, the component performs similar processing for the adjacent grid points in the y and z directions, respectively. In decision block 512, if the current grid point is the same as the maximum adjacent grid point, then none of the adjacent grid points have a value of the objective function that is greater than that of the current grid point and the current grid point represents the closest grid point. If so, the component returns, else the component continues at block 513. In block 513, the component sets the current grid point to the maximum adjacent grid point and loops to block 503 to process the six grid points adjacent to the new current grid point.

Figure 6:
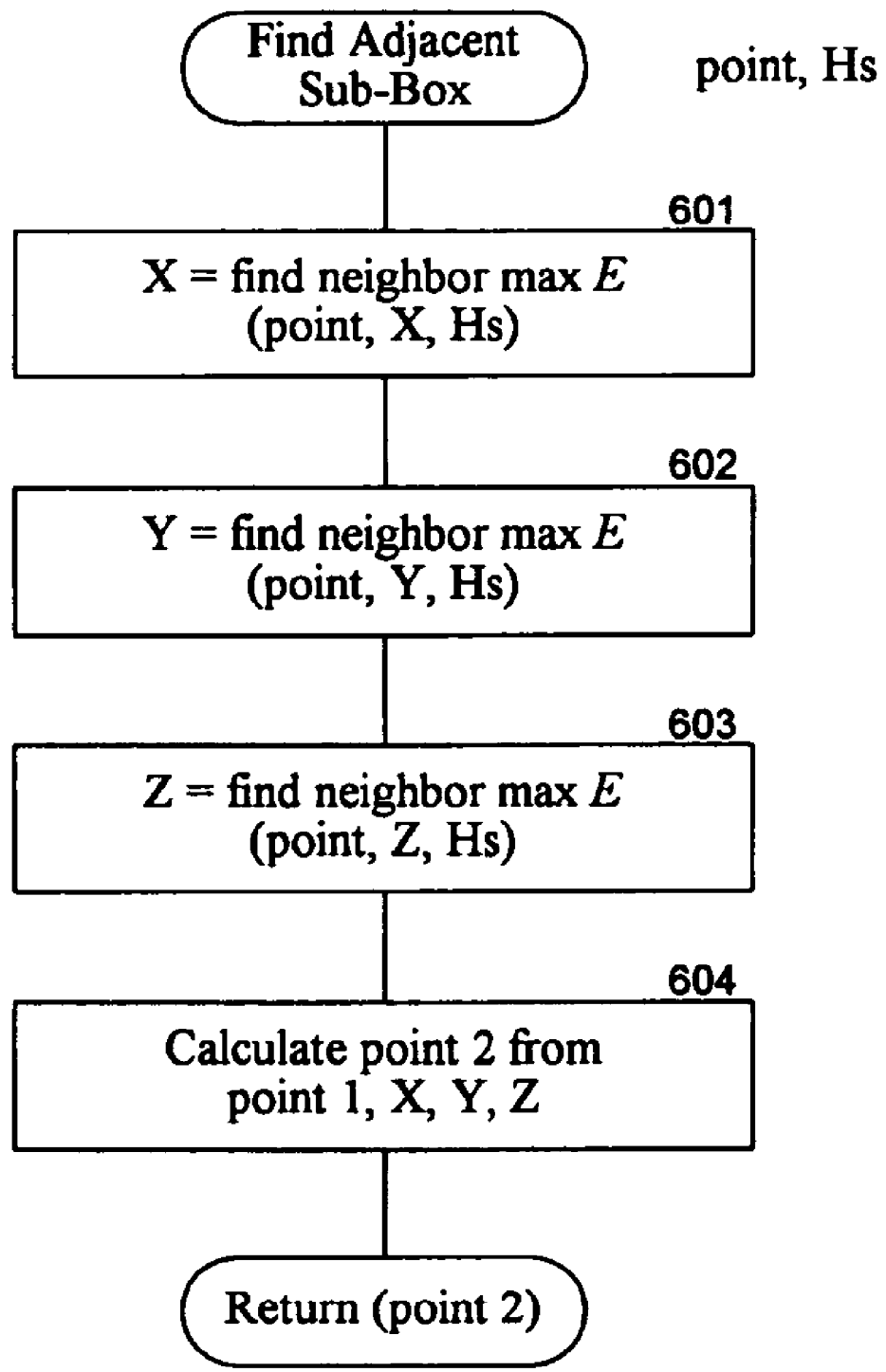
FIG. 6 is a flow diagram illustrating the processing of the find adjacent sub-box component in one embodiment.

FIG. 6 is a flow diagram illustrating the processing of the find adjacent sub-box component in one embodiment. The component is passed the closest grid point and the H matrices. The component identifies the sub-box that contains the marker point. In one embodiment, the component identifies the bounding sub-box as the sub-box whose objective function values in the x, y, and z directions are greatest. The component then calculates and returns the lower left forward grid point of that bounding sub-box to identify the bounding sub-box. In blocks 601-603, the component invokes the find neighbor maximum point passing the closest grid point, an indication of one of the three dimensions, and the H matrices. These components return an indication of the grid points in each of the dimensions that have the largest value for their objective functions. In block 604, the component calculates the lower left forward point of the bounding sub-box and returns.

Figure 7:
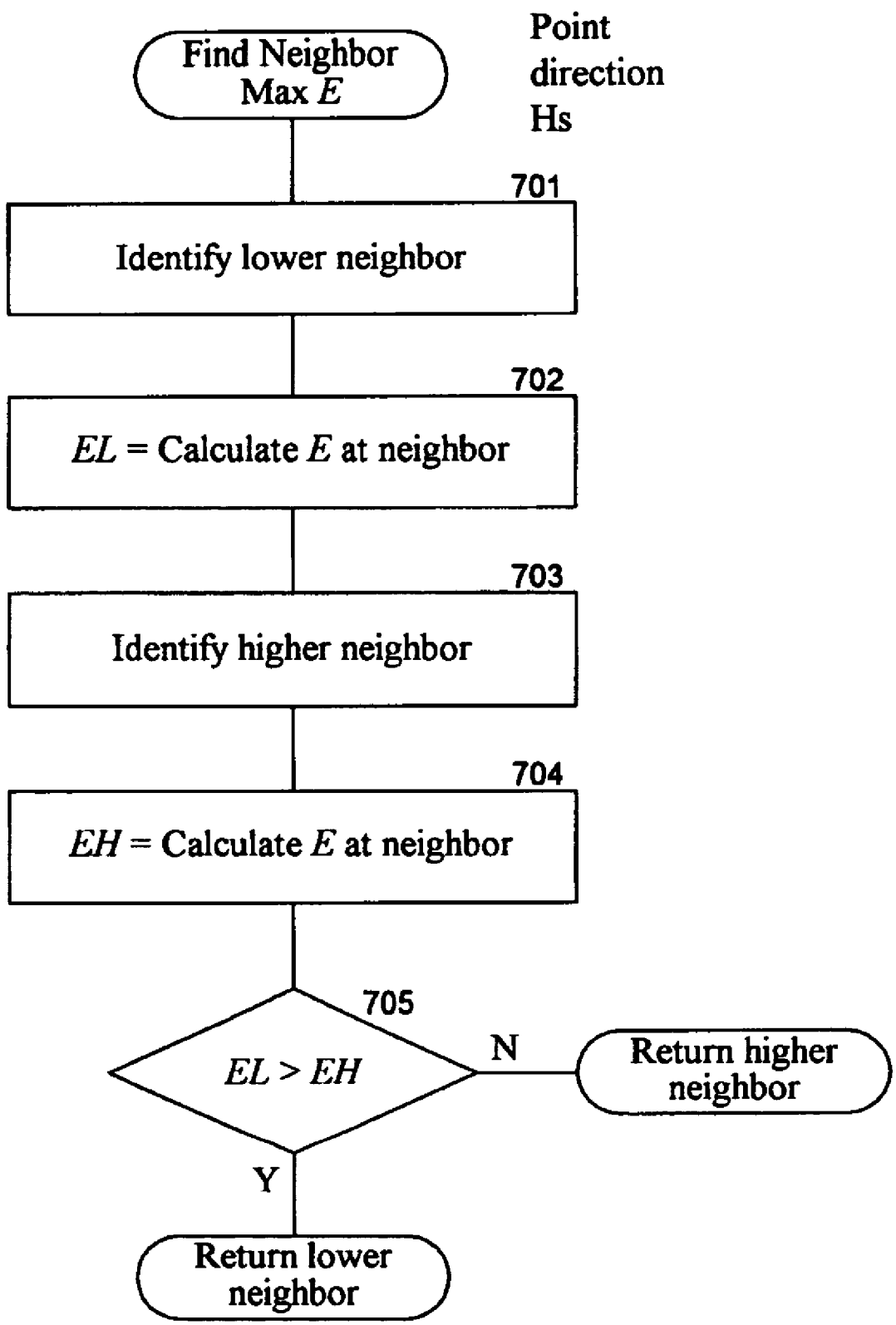
FIG. 7 is a flow diagram illustrating the processing of the find neighbor maximum point component in one embodiment.

FIG. 7 is a flow diagram illustrating the processing of the find neighbor maximum point component in one embodiment. The component is passed the closest grid point, a direction, and the H matrices. In block 701, the component identifies the coordinates of the neighbor grid point in the lower direction. For example, if the closest grid point is (10, 10, 10) and the direction is the x direction, then the identified coordinates are (9, 10, 10). In block 702, the component evaluates the objective function for the lower neighbor grid point. In block 703, the component identifies the upper neighbor grid point. In block 704, the component evaluates the objective function for the upper neighbor grid point. In decision block 705, if the value of the objective function for the lower neighbor grid point is greater than the value of the objective function for the upper neighbor grid point, the component returns the lower neighbor grid point, else the component returns the upper neighbor grid point.

Search for Marker Point

Once the bounding sub-box is identified, the location system calculates the marker point using interpolated H's within the bounding sub-box based on the H's of the grid points. The location system uses a Taylor series expansion of the objective function based on the interpolated H's to converge on the off-grid point with the maximum value of the objective function. The location system uses an iterative technique that starts at an initial point within the bounding sub-box and calculates spatial offsets according to equation (9) until the spatial offsets converge to zero at a point which represents the marker location.

Figure 9:
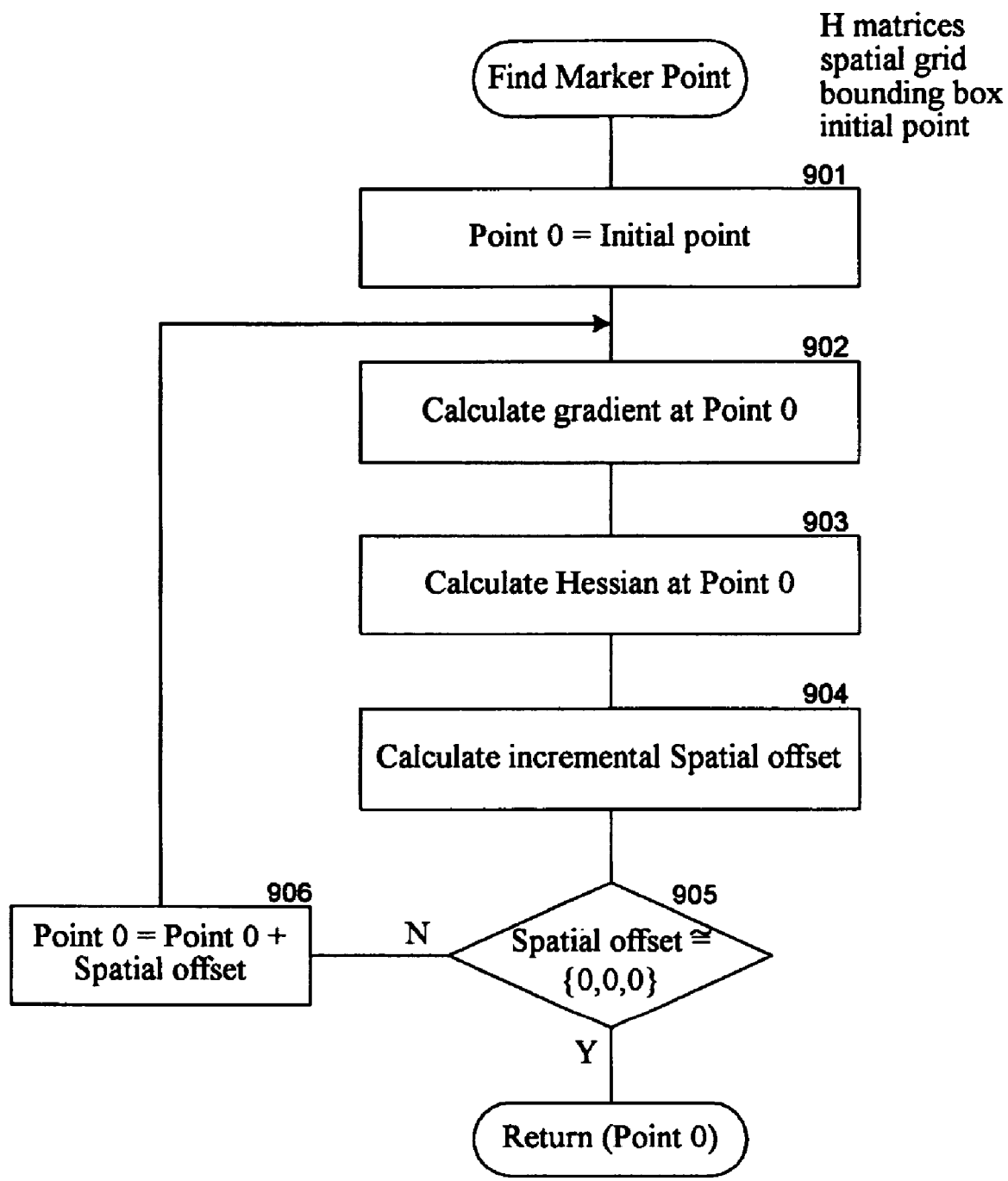
FIG. 9 is a flow diagram illustrating the processing of the find marker point within a bounding sub-box component in one embodiment.

FIG. 9 is a flow diagram illustrating the processing of the find marker point within a bounding sub-box component in one embodiment. The component is passed the H matrices, the spatial grid, the bounding sub-box, and an initial point. The component initializes the current point to the initial point. The component then calculates the spatial offset of the current point according to equation (9). If the spatial offset is not within a certain tolerance of a zero offset, then the component sets the new current point to the previous current point plus the spatial offset. Otherwise, the component has converged to a solution and returns the current point as the marker point. In block 901, the component sets the current point (i.e., point0) to the initial point. In block 902, the component calculates the gradient of the objective function at the current point according to equation (11). In block 903, the component calculates the Hessian of the objective function at the current point according to equation (13). In block 904, the component calculates the incremental spatial offset according to equation (9). In decision block 905, if the spatial offset is within a certain tolerance of zero, then the component returns the current point as the marker pointer, else the component continues at block 906. In block 906, the component sets the new current point to the previous current point plus the spatial offset. The component then loops to block 902 to calculate the next spatial offset.

One skilled in the art will appreciate that although specific embodiments of the location system have been described herein for purposes of illustration, various modifications may be made without deviating from the spirit and scope of the invention. Accordingly, the invention is not limited except by the appended claims.

We claim:

1. A method in a computing system for locating a dipole source of a magnetic field, the dipole source being a marker implanted in or affixed to an organism, the method comprising:

receiving a set of actual measurements, each actual measurement indicative of a component of the magnetic field at each of a plurality of sensors;

providing sets of reference measurements, each set of reference measurements being associated with a location such that an actual measurement from that location is expected to be a linear combination of that set;

providing a set of augmented measurements, such that interference at the sensors is expected to be a linear combination of that set;

selecting the location associated with the set of reference measurements as augmented by the set of augmented measurements that most closely matches the received set of actual measurements; and identifying a location associated with a set of calculated measurements that most closely matches the set of actual measurements wherein the set of calculated measurements is derived from the sets of reference measurements.

2. The method of claim 1 wherein the identifying of a location includes:

calculating sets of calculated measurements corresponding to locations near the selected location based on the sets of reference measurements; and selecting as the location of the source the location of the set of calculated measurements that most closely matches the set of actual measurements.

3. The method of claim 1 wherein the identifying of the location includes searching for the location by iteratively determining how closely sets of calculated measurements match the set of actual measurements.

4. The method of claim 1 wherein the marker is wireless.

5. The method of claim 1 wherein the organism is a human.

6. The method of claim 1 wherein sets of reference measurements are calculated.

7. The method of claim 1 wherein the sets of reference measurements are experimentally derived.

8. The method of claim 7 wherein the sets of reference measurements are experimentally derived by placing a dipole source of a magnetic field at various locations and receiving sets of actual measurements indicative of a component of the magnetic field from the sensors.

9. The method of claim 7 wherein a set of reference measurements for a location comprises sets of actual measurements when the magnetic moment of the dipole source is oriented along an x axis, a y axis, and a z axis with one of the axes being approximately normal to a plane of the sensors.

10. The method of claim 1 wherein the locations associated with the sets of reference measurements are at grid points within a bounding box that contains the source.

11. The method of claim 1 wherein the closeness of a match between two sets of measurements is evaluated based on a least squares analysis.

12. The method of claim 1 wherein the closeness of a match between two sets of measurements is based on an evaluation of an objective function.

13. The method of claim 12 wherein the objective function is $$E_2 = s^T H (H^T H)^{-1} H^T s.$$

14. The method of claim 1 wherein the set of calculated measurements is approximated based on sets of reference measurements for locations near the selected location.

15. The method of claim 14 wherein the approximation is a trilinear interpolation.

16. The method of claim 14 wherein the approximation is a combination of a trilinear and a second order difference interpolation.

17. The method of claim 1 wherein the marker is located within a bounding box divided into sub-boxes, the sub-boxes having corners that are grid points within the bounding box.

18. The method of claim 17 wherein the locations near the selected location correspond to corner grid points of the bounding sub-box that contains the source.

19. The method of claim 18 wherein the locations near the selected location further include grid points adjacent to the corner grid points.

20. The method of claim 1 wherein the identifying of a location includes identifying a point near a candidate point wherein a derivative of an objective function is near zero.

21. The method of claim 20 wherein the objective function is $$E_2 = s^T H (H^T H)^{-1} H^T s.$$

22. The method of claim 1 wherein the identifying of a location includes calculating a spatial offset from a current location according to $$\rho = -C^{-1} b.$$

23. A method in a computing system for locating a marker comprising a resonating magnetic circuit configured to exhibit a dipole magnetic moment and to generate a magnetic field in response to a wirelessly transmitted excitation signal, the marker being implanted in or affixed to an organism, the marker being located within a bounding box having grid points, the marker being located at a marker point within the bounding box, the method comprising:

receiving a set of actual measurements, each actual measurement indicative of a component of the magnetic field at each of a plurality of sensors, the sensors being substantially planar;

providing sets of reference measurements, each reference measurement being associated with one Cartesian component of the magnetic moment, each set of reference measurements being associated with a grid point such that when the marker is at that grid point the actual measurement is expected to be a linear combination of that set;

providing sets of augmented measurements, such that interference at the sensors is expected to be a linear combination of that set;

identifying a grid point that is close to the marker point by evaluating for various grid points an objective function that indicates the closeness of the set of actual measurements to the set of reference measurements at that grid point; and identifying as the marker point a point associated with a set of calculated measurements that closely matches the set of actual measurements wherein the set of calculated measurements is derived from the sets of reference measurements as augmented by the set of augmented measurements and based on the objective function.

24. The method of claim 23 wherein the identifying of the point as the marker point includes:

calculating sets of calculated measurements corresponding to points near the identified grid point based on the sets of reference measurements; and selecting as the marker point the point of the set of calculated measurements that most closely matches the set of actual measurements.

25. The method of claim 24 wherein the objective function is represented by a Taylor series expansion.

26. The method of claim 23 wherein the identifying of the point as the marker point includes identifying a point near a candidate point where a derivative of the objective function is near zero.

27. The method of claim 23 wherein the identifying of a point as the marker point includes calculating a spatial offset from a current point according to $$\rho = -C^{-1}b.$$

28. The method of claim 23 wherein the identifying of a point as a marker point includes searching for the point by iteratively determining how closely sets of calculated measurements match the set of actual measurements.

29. The method of claim 23 wherein the marker is wireless.

30. The method of claim 23 wherein the organism is a human.

31. The method of claim 23 wherein sets of reference measurements are calculated.

32. The method of claim 23 wherein the sets of reference measurements are experimentally derived.

33. The method of claim 32 wherein the sets of reference measurements are experimentally derived by placing a dipole source of a magnetic field at various grid points and receiving sets of actual measurements indicative of a component of the magnetic field from the sensors.

34. The method of claim 32 wherein a set of reference measurements for a grid point comprises sets of actual measurements when the magnetic moment of the dipole source is oriented along an x axis, a y axis, and a z axis with one of the axes being approximately normal to a plane of the sensors.

35. The method of claim 23 wherein the objective function is based on a least squares analysis.

36. The method of claim 23 wherein the objective function is $$E_2 = s^T H (H^T H)^{-1} H^T s.$$

37. The method of claim 23 wherein a set of calculated measurements is approximated based on sets of reference measurements for grid points near the identified grid point.

38. The method of claim 37 wherein the approximation is a trilinear interpolation.

39. The method of claim 37 wherein the approximation is a combination of a trilinear and a second order difference interpolation.

40. The method of claim 23 wherein the marker is located within a bounding box divided into sub-boxes, the sub-boxes having corners that are grid points within the bounding box.

41. The method of claim 40 wherein the grid points near the identified grid point correspond to corner grid points of the bounding sub-box that contains the marker.

42. The method of claim 41 wherein the grid points near the identified grid point further include grid points adjacent to the corner grid points.

43. A system for locating a dipole source of a magnetic field, the dipole source being a marker implanted in or affixed to an object, the method comprising:
  means for receiving a set of actual measurements, each actual measurement indicative of a component of the magnetic field at each of a plurality of sensors;
  means for suppressing the effects of interference in the system by providing a set of augmented measurements;
  means for selecting the location associated with a set of reference measurements adjusted by the set of augmented measurements that most closely matches the received set of actual measurements, each set of reference measurements being associated with a location such that an actual measurement from that location is expected to be a linear combination of that set; and
  means for identifying a location associated with a set of interpolated reference measurements that most closely matches the set of actual measurements.

44. The system of claim 43 wherein the means for identifying a location include means for calculating sets of interpolated reference measurements corresponding to locations near the selected location from the sets of reference measurements.

45. The system of claim 43 wherein the means for identifying the location include means for searching for the location by iteratively determining how closely sets of interpolated reference measurements match the set of actual measurements.

46. The system of claim 43 including means for calculating sets of reference measurements.

47. The system of claim 43 including means for experimentally deriving the sets of reference measurements.

48. The system of claim 43 wherein the locations associated with the sets of reference measurements are at grid points within a bounding box that contains the source.

49. The system of claim 43 wherein the means for identifying the location include means for performing a trilinear interpolation.

50. The system of claim 43 wherein the means for identifying the location include means for performing a trilinear interpolation and a second order difference interpolation.

51. A method in a computing system for locating a dipole source of a magnetic field, subject to interference from other sources, the dipole source being a marker implanted in or affixed to an organism, the method comprising:
  receiving a set of actual measurements, each actual measurement indicative of a component of the magnetic field and a component of the interference at each of a plurality of sensors;
  providing sets of reference measurements, each set of reference measurements being associated with a location such that an actual measurement from that location in the absence of interference is expected to be a linear combination of that set;
  providing a set of augmented measurements, such that interference at the sensors is expected to be a linear combination of that set; and
  selecting the location associated with the set of reference measurements as augmented by the set of augmented measurements that most closely matches the received set of actual measurements.
  identifying a location associated with a set of calculated measurements that most closely matches the set of actual measurements wherein the set of calculated measurements is derived from the sets of reference measurements as augmented by the set of augmented measurements for locations near the selected location using a combination of a trilinear and a second order difference interpolation.

52. The method of claim 51 including weighting the reference measurements to account for reliability of sensors in a sensor array.

53. The method of claim 52 wherein the weighting is provided by multiplying the reference measurements by a whitening matrix.

54. The method of claim 51 including weighting the actual measurements to account for reliability of sensors in a sensor array.

55. The method of claim 54 wherein the weighting is provided by multiplying the actual measurements by a whitening matrix.

56. The method of claim 51 wherein the set of augmented measurements is an augmentation matrix.

57. A method in a computing system for locating a dipole source of a magnetic field, subject to interference from other sources, the dipole source being a marker implanted in or affixed to an organism, the method comprising:
receiving a set of actual measurements, each actual measurement indicative of a component of the magnetic field wherein the reliability of the actual measurements varies;
providing sets of reference measurements, each set of reference measurements being associated with a location such that an actual measurement from that location is expected to be a linear combination of that set;
providing a set of reliability weights that reflects the reliability of the actual measurements; and
selecting the location associated with the set of reference measurements that most closely matches the received set of actual measurements factoring in the reliability weights
identifying a location associated with a set of calculated measurements that most closely matches the set of actual measurements factoring in the reliability weights wherein the set of calculated measurements is derived from the sets of reference measurements for locations near the selected location using a combination of a tri-linear and a second order difference interpolation.

58. The method of claim 57 wherein the set of reliability weights reflects the reliability of sensors in a sensor array.

59. The method of claim 57 wherein the set of reliability weights is applied to the actual measurements.

60. The method of claim 57 wherein the set of reliability weights is applied to the reference measurements.

61. The method of claim 57 wherein the identifying of a location includes calculating a spatial offset from a current location according to $\rho = -C^{-1} b.$

* * * * *

UNITED STATES PATENT AND TRADEMARK OFFICE
CERTIFICATE OF CORRECTION

PATENT NO. : 7,747,307 B2  Page 1 of 1
APPLICATION NO. : 10/679801
DATED : June 29, 2010
INVENTOR(S) : J. Nelson Wright et al.

It is certified that error appears in the above-identified patent and that said Letters Patent is hereby corrected as shown below:

In column 6, line 33-35, delete "By contrast, if one 32×32 $H(H^TH)^{-1}H^T$ matrix is predetermined on a spatial grid with a 1 mm pitch, the storage requirement exceeds four billion numbers." and insert the same on Col. 6, Line 32, after "memory." as a continuation of the Paragraph.

In column 6, line 58, after "box" delete "box".

In column 18, line 50, claim 51, delete "measurements." and insert -- measurements, --, therefor.

In column 20, line 2, claim 57, delete "weights" and insert -- weights, --, therefor.

Signed and Sealed this

Fifth Day of October, 2010

David J. Kappos
*Director of the United States Patent and Trademark Office*